United States Patent
Jones

[11] 3,971,243
[45] July 27, 1976

[54] METHOD FOR DIE FORMING STRIP MATERIAL

[75] Inventor: Everett E. Jones, Wichita, Kans.

[73] Assignee: The Boeing Company, Seattle, Wash.

[22] Filed: Jan. 9, 1975

[21] Appl. No.: 539,745

Related U.S. Application Data

[62] Division of Ser. No. 461,995, April 18, 1974, Pat. No. 3,888,618.

[52] U.S. Cl. ............................ 72/385; 72/63
[51] Int. Cl.² ............................ B21D 13/02
[58] Field of Search .......... 72/60, 63, 184, 190, 72/385, DIG. 14; 425/343, 369, 370

[56] References Cited
UNITED STATES PATENTS

| | | | |
|---|---|---|---|
| 191,441 | 5/1877 | Kissam | 72/184 |
| 2,609,314 | 9/1952 | Engel et al. | 425/370 |
| 2,799,317 | 7/1957 | Toulmin | 72/DIG. 14 |
| 2,975,817 | 3/1961 | Neff | 72/190 |
| 3,521,472 | 7/1970 | Bringewald | 72/184 |
| 3,792,952 | 2/1974 | Hamon | 425/370 |

FOREIGN PATENTS OR APPLICATIONS

1,039,016  9/1958  Germany ...................... 72/184

Primary Examiner—Lowell A. Larson
Attorney, Agent, or Firm—Christensen, O'Connor, Garrison & Havelka

[57] ABSTRACT

A pair of mating die halves are employed to die form an elongate strip or ribbon composed of material capable of undergoing plastic deformation. The first die half is an elongate, substantially rigid member having a die face of predetermined configuration. The second die half is an elongate, flexible die member having a die face of configuration complementary to the die face of the rigid die half. The die face of the rigid die half is fed into registering relationship along a substantially straight path with the die face of the flexible die half. The flexible die half is fed toward the rigid die half along an arcuate path until it registers with the rigid die half, after which it is fed along a straight path parallel to that of the rigid die half. The elongate ribbon to be formed is fed between the die halves as the latter are fed into registration. The die halves are fed into a pressure forming chamber which applies mutually opposing forces to the rigid and flexible die halves causing a portion of the strip of material situated between the die faces to undergo plastic deformation. The die halves and ribbon are intermittently fed into and stopped in the pressure forming chamber. A pressure sufficient to cause the ribbon to undergo deformation is applied to the die halves while they are stopped in the pressure chamber. As a predetermined length of the elongate die members and strip of material is fed into the pressure chamber, the same length of strip of material and accompanying die halves is simultaneously withdrawn from the pressure chamber. Downstream of the pressure chamber the flexible die half is separated from the rigid die half to free the formed strip. Thereafter the strip can be severed into desired lengths.

8 Claims, 6 Drawing Figures

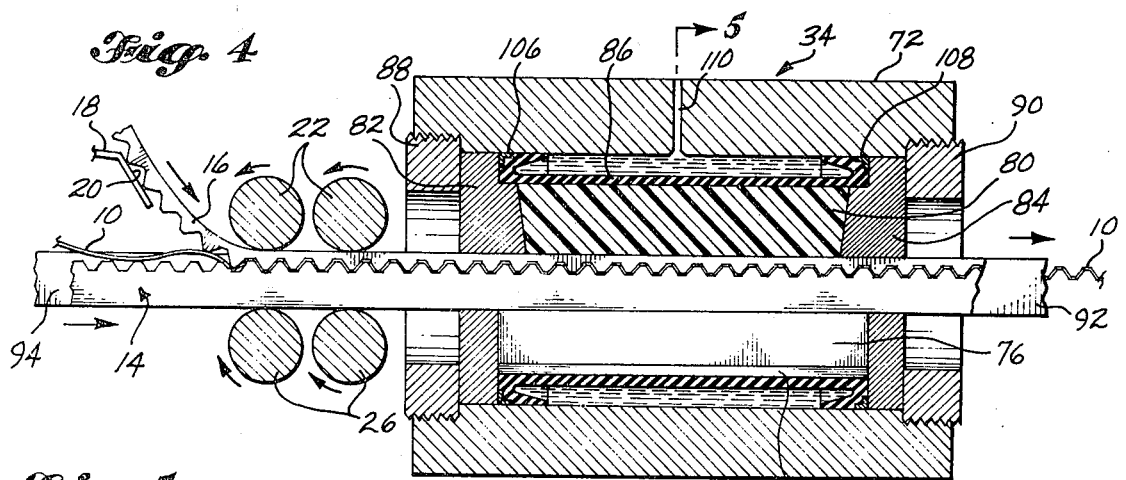
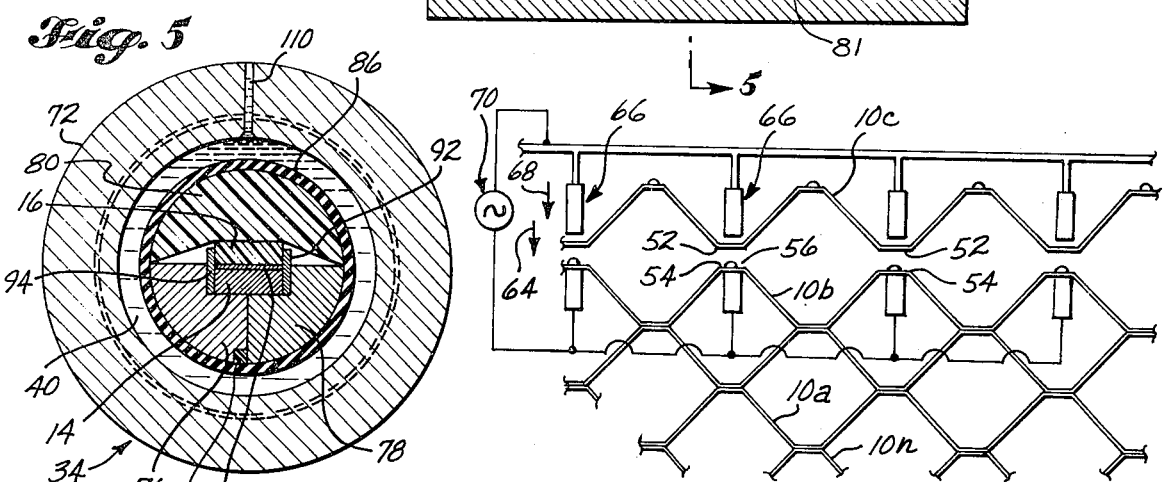
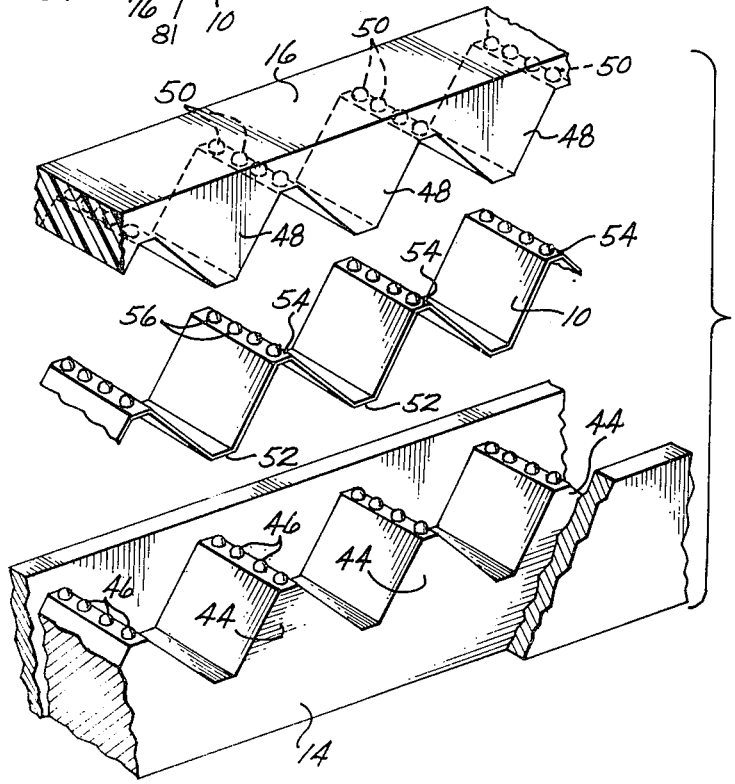

METHOD FOR DIE FORMING STRIP MATERIAL

This application is a continuing application based on Ser. No. 461,995, filed Apr. 18, 1974, now U.S. Pat. No. 3,888,618 the benefit of the filing date of which is hereby claimed under 35 U.S.C. 120.

BACKGROUND OF THE INVENTION

The present invention relates to a method and apparatus for die forming elongate strips of material capable of undergoing plastic deformation, and more particularly to a method and apparatus for intermittently dieforming successive segments of an elongate strip of such material into a continuous, formed strip of finite length.

Flat strips or ribbons of material have been formed into corrugated strips by feeding the ribbon through gear-like, mating dies, or by positioning the ribbons between elongate dies having a length substantially equal to or greater than the length of the corrugated strip being produced. Although these prior art methods can be used to produce corrugated strips having a cell shaped structure suitable for use in manufacturing structural, honeycomb cores, these methods do not produce a formed strip with the precision and accuracy required for use in compounding cores suitable for applications in the aerospace industry.

Moreover, it is desirable to compound honeycomb cores for use in the aerospace industry using newly automated techniques of projection welding. If projection welding is to be used, a projection must be formed on the nodes of the corrugated strip at very precise locations. The height and spacing of these projections must be very precisely and accurately formed in order to utilize the automated techniques. The prior art methods and apparatus for producing such corrugated strips are not sufficiently accurate to produce a uniform strip with precisely formed nodular projections.

A broad object of the present invention is to provide methods and apparatus for pressure forming elongate, narrow ribbons composed of material capable of undergoing plastic deformation into predetermined shapes. Another object of the present invention is to provide methods and apparatus for die forming successive segments of an elongate ribbon into a continuous ribbon having a repetitive formed configuration. Another object of the present invention is to provide methods and apparatus for forming metal ribbons into a corrugated shape adequate for use in compounding honeycomb cores. Another object of the present invention is to provide methods and apparatus for forming metal ribbons into a corrugated shape with precisely defined and accurately located projections at the nodes of the corrugated strips.

SUMMARY OF THE INVENTION

The foregoing objects, and other objects that will become apparent upon reading the following specification, are realized in a method for die forming a strip of material capable of undergoing plastic deformation. A first die half is fed into superposed relationship with a second die half at a first location upstream from a forming zone. The first die half is an elongate, flexible die member having a corrugated forming surface that runs longitudinally thereof. The second die half has a corrugated forming surface complementary to the forming surface on the first die half. The first die half is fed to the first location along a predetermined path from a second location upstream from the first location while the first die half is fed to the first location along an arcuate path from a third location upstream from the first location. The third location is transversely spaced from and adjacent the second location relative to the feed direction of the second die half. A strip of material to be die formed is fed into sandwiched relationship between the first die half and the second die half at the first location in a manner to gather sufficient material from the strip between the forming surfaces of the two die halves to prevent substantial stretching of the material. Thereafter, a forming pressure is applied to the two die halves in the forming zone to simultaneously form a plurality of corrugations in the metal strip.

BRIEF DESCRIPTION OF THE DRAWINGS

A better understanding of the present invention will be derived from reading the ensuing specification in conjunction with the accompanying drawings wherein:

FIG. 2 is an exploded, isometric view of the dies and a strip of material after being formed between the dies;

FIG. 3 is a schematic view of a projection welding apparatus for integrating several formed strips into a honeycomb structural member;

FIG. 4 is a longitudinal sectional view of the apparatus of FIG. 1;

FIG. 5 is a cross-sectional view of the apparatus of FIG. 4; and

DESCRIPTION OF PREFERRED EMBODIMENT

Figure 1:
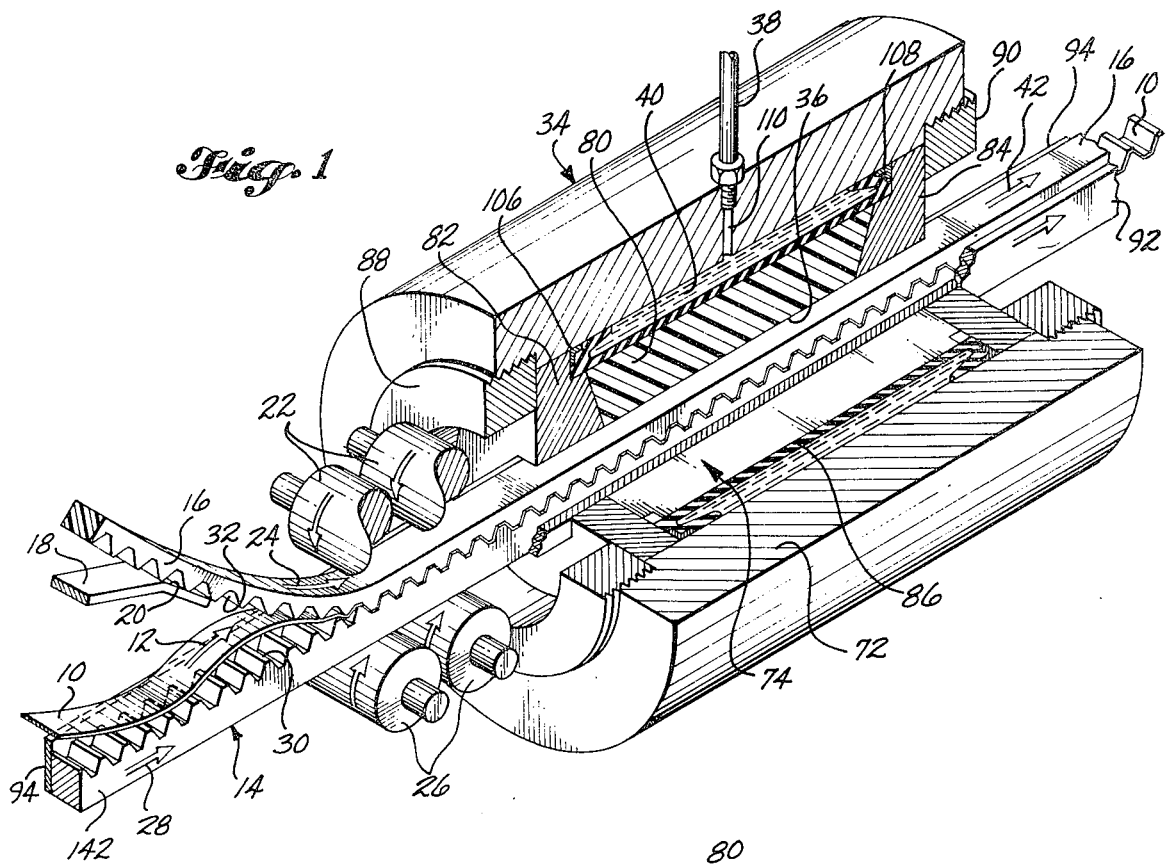
FIG. 1 is a partially broken away, isometric view of the rigid die, the flexible die, the pressure forming means, the guide means, and the feed means of the present invention.

Referring first to FIG. 1, a strip 10 composed of material capable of undergoing plastic deformation is fed in the direction of arrow 12 and is positioned between an elongate, substantially rigid lower die half 14 and an elongate, flexible upper die half 16. A guide member 18 has an angular face 20 which holds the upper flexible die half 16 in angular orientation relative to the lower die half 14. A first set of rollers 22 frictionally engage the upper surface of the flexible die half 16 and feed the upper die half 16 in the direction of arrow 24 along an arcuate path from the location of the guide member into registration with the lower die half. Simultaneously a second set of rollers 26 frictionally engage the bottom surface of the lower die half 14 and feed it along a straight path in the direction of arrow 28. The lower die half 14 has a die face (or forming surface) 30 which includes a plurality of spaced, truncated pyramidal shaped, rigid members formed integrally with the lower die half 14. The upper die half 16 has a die face 32 which is complementary to the die face 30 of the lower die half 14 and includes a plurality of spaced, truncated pyramidal shaped members which interengage with the spaces between the pyramidal shaped members on the die face 30 of the lower die half.

As the upper die half 16 and the lower die half 14 are fed respectively in the direction of arrows 24 and 28 the strip to be formed is gathered into the spaces between the pyramidal shaped members on the die face 30. This gathering is accomplished by feeding the upper flexible die half 16 into engagement with the lower die half 14 along the arcuate path, causing the pyramidal members on the die face 32 of the upper die member to gradually descend into the spaces between the pyramidal members of the die face of the lower die half. At the same time the truncated end of the pyramidal members rotate in the direction of arrow 24 from a position slightly upstream from the space between the pyramidal members on the lower die half into precise alignment with these spaces. In this manner the strip material is gathered between the die faces with little or no stretching of the material in the longitudinal dimension.

Figure 6:
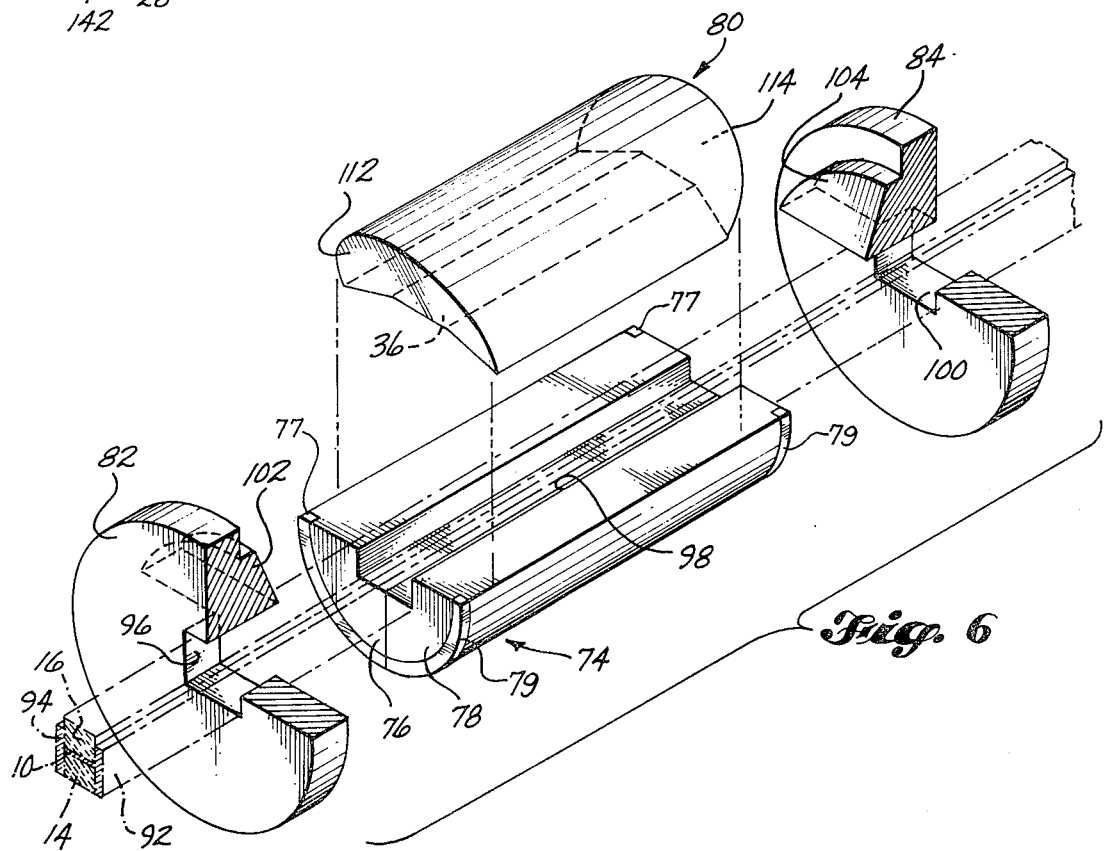
FIG. 6 is an exploded, isometric view of a portion of the pressure forming means.

The feed rollers 22 and 26 are spaced apart at a predetermined distance so that opposing forces are applied respectively to the upper die half 16 and the lower die half 14 to perform the metal strip into the shape of the die faces 30 and 32. When the die halves reach the position between the rollers 22 and 26, the upper die half 16 is interengaged with the lower die half 14 such that both die halves are fed in a substantially straight path into a pressure forming chamber, generally designated 34. A predetermined length of the die halves and of the preformed strip 10 are fed into a pressure zone within the pressure forming chamber 34. This pressure zone will be described in greater detail below but corresponds to the lower surface 36 of pressure member 80 (FIG. 6).

Still referring to FIG. 1, pressure forming chamber 34 includes a hydraulic chamber 40 into which a pressurized, hydraulic fluid is supplied through conduit 38. Hydraulic pressure, in one embodiment on the order of 20,000 to 30,000 p.s.i., is supplied through conduit 38 to transmit a downwardly directed force onto a portion of the upper die half 16 and a mutually opposite force directed upwardly onto a portion of the lower die half 14 sufficient to cause the strip 10 within the pressure zone to undergo permanent plastic deformation. The hydraulic pressure supplied to the pressure forming chamber 34 is applied to the die halves 14 and 16 intermittently with the feeding step. That is, a predetermined length of die halves with the captive, preformed strip is fed into the chamber. The predetermined length corresponds substantially to the length of the pressure zone. The feeding of the die halves into the chamber is then stopped, at which time hydraulic pressure is supplied to the pressure forming chamber 34. Thereafter the hydraulic pressure is released from the pressure forming chamber and an additional predetermined length of die half is forwarded into the chamber while the length of the strip just formed along with the die halves are simultaneously advanced from the pressure zone in the direction of arrow 42. At the same time an additional length of the strip is fed between the die halves 14 and 16 at the location upstream from the pressure forming chamber 34 and the rollers 22. Although not shown, the rollers 22 and 26 are driven by electric or hydraulic motors or other suitble means for rotating the rollers. Other suitable means for advancing the die halves and ribbon through the pressure chamber can also be used in accord with the invention. If desired, the rollers 22 and 26 can be idler rollers while the dies can be pushed through the forming zone by hand, or by other suitable drive means. Appropriate control circuitry is also employed to intermittently supply hydraulic pressure to the pressure forming chamber 34 alternately with the introduction of the die halves into the pressure forming zone.

The type of material which can be formed with the present invention includes any composition which can be acquired in strip form (for example, a rod or ribbon) and which is capable of undergoing plastic deformation when pressure is applied to a segment of the strip when it is situated between die faces. The strip 10 shown in FIG. 2 comprises a ribbon having a longitudinal dimension, and a thickness dimension which is relatively small compared to its width dimension. A high temperature metal alloy ribbon composed of Inconel alloy 625 can be formed by the method and the apparatus of the present invention as broadly described above. Other materials such as titanium, corrosion resistant steels and mild steels can also be formed with the invention. When strip material such as a metal alloy is being formed, the lower die half is preferably composed of a substantially rigid metallic composition, such as a high carbon steel conventionally used for forming dies. The upper die half 16 can be formed of any suitable flexible material which is capable of withstanding the pressures applied in the pressure forming chamber without itself undergoing any permanent deformation. Of course the flexible material also must be capable of being machined or cast (molded) to shape so that a die face can be formed thereon. A suitable material for the elongate flexible die member is available under the tradename "D-7", which is a polyester toluene di-isocyanate adduct of 7.1% —NCO— content reacted with aromatic amines to form an elastomeric polyurethane resin, from American Cyananid of Bound Brook, New Jersey.

Exemplary die faces are shown in FIG. 2. The lower die half 14 includes a series of upwardly extending pyramidal segments which have upwardly convergent side faces. The lower edges of the side faces are separated by a planar surface having a width substantially equal to the truncated upper surface of the pyramidal segments. These pyramidal segments are numbered 44. Upwardly extending hemispherical projections 46 are machined or otherwise suitably formed on the upper truncated surfaces of the pyramidal segments. These hemispherical projections (or nibs) are placed on the lower rigid die half 14 for purposes of forming similarly shaped projections in the strip or ribbon to be formed. The upper die half 16 has pyramidal segments 48 machined thereon, or cast as a part thereof, which are complementary to pyramidal segments 44 on the bottom die, i.e., the truncated pyramidal projections 48 on the upper die half 16 are capable of registration with the spaces between the truncated pyramidal projections 44 on the lower die half. As shown, a plurality of hemispherical recesses 50 can be formed on the bottom face of the upper die half between the bases of the successive pyramidal segments 48. These hemispherical recesses correspond in spacing to and are slightly larger than the hemispherical projections 46 on the die face of the lower die half 14. The spacing between pyramidal segments on the upper die half 16 and the size of the hemispherical recesses 50 must be suitably proportioned so that the material being deformed can flow between the walls of the interengaging pyramidal segments and the corresponding projections and recesses on the die halves. In a preferred embodiment using the D-7 polyurethane material for the upper die half, the hemispherical recesses 50 need not be formed in the upper die half since the polyurethane material is not only flexible but resilient. When this material is used and the forming pressure is applied to the strip through the die halves, the hemispherical projections on the bottom die half will form corresponding, transient recesses in the elastic upper die and at the same time will form the hemispherical projections in the ribbon.

It is to be understood that the die face on the upper die half need not be complementary to the die face on the lower die half, but that several configurations can be utilized to form an elongate strip into a desired configuration. The die faces or forming surfaces which can be utilized with the broad aspects of the present invention are limited only by the imagination of the user of the invention and the limitations inherent in machining and casting die surfaces and in forming materials using hydraulic (or equivalent) pressure forming methods.

With this die configuration a smooth metal strip or ribbon can be formed into the configuration of the corrugated metal ribbon 10 shown in FIG. 2. This metal ribbon is corrugated in longitudinal section, each of the corrugations of which has a ridge and hollow corresponding to the shape of the complementary die halves. The ribbon has a plurality of spaced, lower nodes 52 joined to a plurality of spaced, upper nodes 54 by angular side walls. The upper nodes 54 contain nibs or projections 56 the use of which will be described below.

The ribbon and the die halves are removed from the end of the pressure chamber opposite to that into which they are fed. As a predetermined length of material and die halves is fed into the chamber, a corresponding length of ribbon and die halves is removed. After the entire length of die halves and ribbon has been fed through the pressure chamber, the die halves are separated and the ribbon is removed from the dies. In normal operation, ribbons on the order of from 18 to 24 inches are produced in a pressure chamber having an effective forming zone of approximately 9 inches. Thus the die halves and ribbon can be fed through the chamber in four successive steps. If desired, longer lengths of ribbon can be formed by merely preparing longer lengths of die halves and advancing them through the pressure chamber in a greater number of successive steps.

In accord with the present invention after several formed strips have been separated from the die halves, a plurality of formed strips 10 can then be placed in stacked relationship as illustrated in FIG. 3. As shown a formed strip 10b is joined in superimposed relationship to a similar strip 10a in turn joined to previously formed strips 10n to form a honeycomb for a structural member. Subsequently produced strips are thereafter positioned in superimposed relationship with the preceding strip 10b so that the bottom nodes of the strip 10c are spaced above the top of nodes 54 of the previous strip 10b. The strip is then moved in the direction of arrow 64 so that the bottom surfaces of the bottom nodes 52 contact the upper surface of the nibs or projections 56 on the top nodes 54 of the strip 10b. Thereafter a plurality of welding electrodes 66, schematically shown, are moved in the direction of arrow 68 so that the electrodes are positioned to weld the bottom surface of the nodes 52 to the projections 56 on the nodes 54. A bottom set of electrodes 67 are positioned in contact with the bottom surfaces of the nodes 54. To accomplish the welding, power is supplied to the electrodes 66 from a suitable power source 70, shown schematically, to join the strip 10c to the strip 10b by the technique known as projection welding. Subsequently formed strips are then positioned on strip 10c in a similar manner to compound or fabricate the honeycomb core to a desired size. Such a honeycomb structure is one end use for the strips formed by the method and apparatus of the present invention.

Referring now to FIGS. 1, 4, 5, and 6, the pressure forming chamber 34 includes a thick outer cylindrical shell 72 which houses a metal, lower core member 74 formed in two halves 76 and 78, an upper plastic pressure core member 80, end plates 82 and 84 and a bladder 86 composed of rubber or other suitable elastic material. The lower core member 74, the upper core 80 and the end plates 82 and 84 are held in the bore of the cylindrical shell 72 by annular plugs 88 and 90 which are threaded into the ends of the bore of the cylindrical shell 72. The end plates 82 and 84 are slidably engaged in the bore of the cylindrical shell on respective ends of the pressure core members. The upper and lower halves when engaged are of substantially rectangular cross-section. A pair of indexing bars 92 and 94, also having a thin rectangular cross-section, are placed on mutually opposing sides of the die halves 14 and 16 and fed into the pressure zone with the die halves. The indexing bars align the upper and lower die halves as well as position the strip between the die halves. In one embodiment the indexing bars can be formed integrally with the lower rigid die half. The end plate 82 contains a rectangular opening 96 which forms an entrance port for the die halves and the indexing bars into the pressure forming chamber 34. The width of the entrance port 96 is sufficient to receive the combined width of the side indexing plates 92 and 94 and the upper and lower die halves 14 and 16 as shown in ghost outline in FIG. 6. The side faces of the entrance port 96 serve as guide faces to laterally space plates 92 and 94 from each other. This lateral spacing is such that the sides of the upper and lower die halves 14 and 16 are aligned and so that the strip of material 10 to be formed is positioned between the side faces of the die halves 14 and 16.

The lower core 74 is semi-cylindrical in cross-section. It is formed in two halves 76 and 78 for ease of machining, however it can be formed in a single piece if desired. A rectangular channel 98 runs along the longitudinal dimension of the open diametrical face of the semi-cylindrical lower core 74. The channel 98 has a depth of less than the combined height of the die halves 14 and 16 containing the ribbon to be formed. The end faces of the lower core lie perpendicular to the longitudinal axis of the core. The intersecting edges of the end faces and the semi-cylindrical lower surface of the lower core 74 are notched to provide curved, shoulder-like, recesses into which arcuate seal members are molded. Two seal members 77 are provided on core half 76 and two seal members 79 are provided on the core half 78. The seal members can be made from the same polyurethane material from which the upper die half is made. Additionally, a similar longitudinal seal, made from the same material, is positioned along the intersection of the core halves 76 and 78 where they intersect along the semi-cylindrical face. A notch is provided in core half 76 adjacent this intersection to accommodate the seal 81 (best seen in FIGS. 4 and 5). The purpose of these seals 77, 79 and 81 is to prevent the bladder 86 (FIG. 1) from extruding between the lower core and the inner walls of the pressure chamber when fluid pressure is applied inside the bladder. The end faces of the lower core 74 abut against respective inner faces of the end plates 82 and 84 while the channel 98 is aligned with the bottom portion of the entrance port 96 in the entrance plate 82. The exit end plate 84 contains an exit port 100 similar to the entrance port 96 in the entrance plate 82. The exit port is also aligned with the rectangular channel 98 of the lower core 74. Shoulders 102 and 104 on the inside surfaces of the entrance and exit plates 82 and 84 respectively engage the top surface of the lower core 74 to prevent it from moving upwardly so that the bottom surface of the channel 98 cannot become misaligned with the bottom surfaces of the entrance and exit ports 96 and 100.

The upper core 80 is composed of a plastic material, for example polyurethane, similar or identical to the polyurethane utilized for the flexible upper die half 16. The upper plastic core has a generally semi-cylindrical configuration with inwardly and downwardly convergent end faces 112 and 114. The shoulders 102 and 104 on the entrance and exit plates 82 and 84 are mirror images of the end faces 112 and 114 on the upper core and abut with respective ones of the end faces on the upper core. The upper core member 80 is sized so that the longitudinal bottom edges thereof can contact or abut the outer longitudinal edges of the upper face of the base member 74. The bottom surface of the plastic core member has a central longitudinally running face which abuts the top surface of the upper die half 16 and two downwardly and outwardly sloping, longitudinally extending, side faces which intersect with the bottom outside edges of the plastic core.

A cylindrically shaped bladder 86 is positioned around the upper core and lower core members. Each of the ends of the bladder are turned outwardly in a ring-like configuration to contact the inside faces of the end plates 82 and 84. The bladder is so shaped to form the fluid-tight pressure chamber 40 between the bore of the cylindrical shell 72 and the outer wall of the bladder 86. Annular seals 106 and 108 are positioned at the intersection of the inner peripheral edge of the end plates 82 and 84 and the bore of the shell 72 and contact the ring-like edges of the bladder 86 to prevent the bladder from extruding through the intersecting faces of the end plates and the bore of the shell.

Hydraulic fluid is supplied to the chamber 40 through a channel 110 formed in the outer shell 72. Channel 110 is supplied with the fluid through 38 (FIG. 1) connected to a conventional high pressure hydraulic fluid source (not shown). As hydraulic fluid is admitted to the chamber 40, hydraulic pressure is applied to the walls of the bladder 86. This pressure is in turn transmitted to the lower pressure core member forcing it up against the bottom face of the shoulders 102 and 104 on the end plates 82 and 84. Simultaneously equal and opposite pressure is applied to the plastic upper core member 80 forcing it downwardly toward the base member 74. This force is transmitted through the bottom face 36 of the upper core member to the upper die half 16 at the same time an equal and opposing force is applied to the bottom surface of the lower die half 14, thereby causing the ribbon 10 to confirm to the die faces. A pressure chamber of this configuration is capable of transmitting pressures to the die halves which are sufficient to cause the metal ribbon or other material between the die halves to undergo permanent deformation For the alloy ribbon used in the honeycomb structure hydraulic pressures on the order of 20,000 p.s.i. to 30,000 p.s.i. are adequate.

The present invention has been described in relation to a preferred embodiment. One of ordinary skill in the art will be able to effect various changes to, substitutions of equivalents in, and alterations to the preferred methods and apparatus described herein. For example, continuous lower and upper die halves can be employed with the present invention rather than the die halves of finite length as disclosed above. With a pressure forming zone of approximately 9 inches an internally corrugated, rigid, ring die having a diameter on the order of 6 to 8 feet can be employed. A similar externally corrugated flexible ring die of slightly smaller (or larger) diameter would be used in conjunction with the rigid, ring die. The path through the forming zone would be made slightly arcuate on a radius conforming to the radius of the rigid, ring die. In the localized area around the forming zone, operation of the apparatus would be substantially the same as that disclosed above, however, it would allow the production of corrugated strips of indefinite length rather than strips of a finite length.

Another modification that can be made to the present invention is to gang several die halves in side-by-side relationship and to advance them through a widened forming zone simultaneously to produce several formed strips at the same time. This modification would use several of the rigid and flexible die halves as disclosed above with indexing bars separating each of the die half sets. The only major modification to the apparatus disclosed above would be to enlarge the forming zone in the dimension transverse to the advance path of the die therethrough in order to simultaneously accommodate the desired number of die sets. Additional alterations can also be made to the invention. As additional examples, the die faces can be changed as desired consistent with the limitations of the method and apparatus, other materials not specifically disclosed can be substituted as desired, an entirely different pressure chamber can be utilized within the broad aspects of the invention, and of course the end uses for the materials may be substantially different. It is therefore intended that the present invention be limited only by the method and apparatus heretofore described and hereafter defined in the appended claims.

What is claimed is:

1. A method for die-forming a strip of material capable of undergoing plastic deformation comprising:
feeding a first die half into superposed relationship with a second die half at a first location upstream from a forming zone, said first die half being an elongate, flexible die member having a corrugated forming surface running longitudinally thereof, said second die half having a corrugated forming surface complementary to the forming surface on said first die half, said second die half being fed to said first location along a predetermined path from a second location upstream from said first location, said first die half being fed to said first location along an arcuate path from a third location upstream from said first location, said third location being transversely spaced from and adjacent said second location relative to the feed direction of said second die half along said predetermined path,
feeding said strip of material into sandwiched relationship between said first die half and a second die half at said first location upstream from said forming zone, said strip being fed between said first and second die halves at said first location in a manner to gather sufficient material from said strip between the forming surface of said first die half and the complementary forming surface of said second die half to prevent substantial stretching of said material, and applying a forming pressure to said die halves in said forming zone to simultaneously form a plurality of corrugations in said metal strip.

2. The method of claim 1 wherein said die half comprises a rigid elongate member, said predetermined path of said second die half being a substantially straight path from said second location, through said first location, and to said forming zone, said predetermined path of said first die half being arcuate until said strip is positioned in sandwiched relationship between said die halves and thereafter being straight through said forming zone.

3. The method of claim 1 further comprising:

after releasing said pressure, advancing said first and second die halves and said formed strip from said forming zone to a second location downstream from said forming zone, and separating said die halves to remove said forming strip.

4. The method of claim 1 wherein said forming surface on said first die half and said complementary forming surface on said second die half are configured to form a corrugated ribbon, each repetitive corrugation of said forming surface of said first die half having a first surface oriented along a predetermined reference plane, a second surface adjoining said first surface and extending away from said first surface at an oblique angle, a third surface adjoining said second surface and extending away from said second surface at an oblique angle, said third surface being substantially parallel to said reference plane, and a fourth surface adjoining said third surface and extending away from said third surface at an oblique angle, said first, second, third, and fourth surfaces periodically repeating to form a continuous corrugated forming surface.

5. The method of claim 4 wherein said forming surface of said first die half further includes a projection, on said third surface, the forming surface of said second die half being elastic.

6. The method of claim 5 wherein said forming surface on said second die half includes a recess complementary to the projection on said first die half.

7. The method of claim 1 wherein said feeding of said die halves and strip into said forming zone occurs alternately with said applying of pressure in said forming zone.

8. The method of claim 2 further comprising:

preforming said strip prior to feeding said strip and said die halves into said forming zone by feeding said first and second die halves between mutually opposing fixed restrictions positioned at a fourth location downstream from said first location and upstream from said forming zone, thereby causing said strip to undergo some inelastic deformation while causing said strip to undergo insubstantial stretching in the elongate direction prior to entering said forming zone.

* * * * *